May 3, 1949.  K. A. HOLST  2,469,114
SHAFT SEAL
Filed June 2, 1945
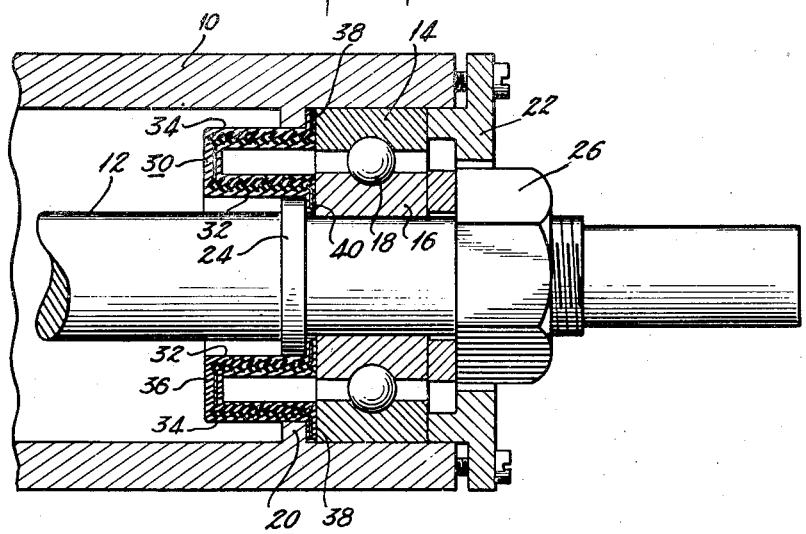
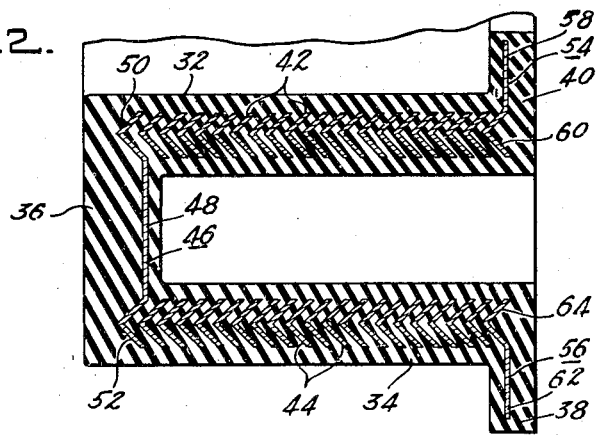
INVENTOR
Knuth Arnold Holst
BY
Janis C. Marble
ATTORNEY Patented May 3, 1949

2,469,114

UNITED STATES PATENT OFFICE 2,469,114

SHAFT SEAL

Knute Arnold Holst, Astoria, Long Island, N. Y., assignor to Pitometer Log Corporation, New York, N. Y., a corporation of New York Application June 2, 1945, Serial No. 597,197

15 Claims. (Cl. 286—11)

My invention relates to fluid-tight seals and more particularly to seals adapted for use in connection with a shaft which is required to turn through only a relatively small angle. Such shafts are employed in connection with various kinds of indicating equipment where it is necessary to transmit a limited amount of movement through the wall of a vessel which is maintained under pressure. Due to the limited movement involved, it is possible to provide a seal of flexible material having one end tightly secured to the wall of the chamber and the other end tightly secured to the shaft, the flexibility of the material itself permitting the necessary amount of turning. However, difficulty has been experienced with this type of seal in preventing undesirable distortion of the flexible material under the influence of the fluid pressure. If the seal is flexible enough to permit the desired turning without imposing any substantial torsional resistance, it is too flexible to properly resist the distortion by the fluid pressure, whereas if it is made stiff enough to resist such distortion, it imposes too much torsional resistance to turning.

One of the objects of my invention is to provide a shaft seal which is sufficiently flexible torsionally, while at the same time being substantially rigid in the direction necessary to resist distortion due to fluid pressure. Another object of my invention is to provide a seal of this type which occupies a minimum of space in axial direction.

Further objects and advantages of my invention will be apparent from the following description considered in connection with the accompanying drawings which form a part of this specification and in which:

Fig. 1 is a cross-sectional view of a shaft seal in accordance with my invention; and Fig. 2 is a cross-sectional view of a portion of the seal shown in Fig. 1, but on a substantially larger scale.

Referring more particularly to Fig. 1, reference character 10 designates a portion of a vessel or housing which is arranged to sustain a substantial fluid pressure. A shaft 12 is rotatably mounted in the housing 10 by means of an antifriction bearing, such as the ball bearing having an outer race 14, an inner race 16, and a series of balls 18. As shown, the outer race 14 is fixed within the housing 10 by being clamped between an annular shoulder 20 and a gland 22, while the inner race 16 is fixed to the shaft 12 by being clamped between a collar 24 on the shaft and a nut 26 threaded on the shaft.

Reference character 30 designates generally a fluid-tight shaft seal. As shown in Fig. 1, this seal includes an inner cylindrical portion 32 and an outer cylindrical portion 34 concentric therewith, the two portions being joined together at one end by means of an annular radial portion 36. The opposite end of the outer cylindrical portion 34 is formed with an outwardly extending flange 38 which is clamped between the outer race 14 and the shoulder 20, while the corresponding end of the inner cylindrical portion 32 is formed with an inwardly extending flange 40 which is clamped between the inner race 16 and the collar 24.

The seal 30 is made of molded flexible impervious material, such as rubber. Consequently, the inner flange 40 may be rotated a limited amount with respect to the outer flange 38 due to the flexible nature of this material. The greater the axial length of the seal, the further its ends may be turned with respect to each other without injuring the material thereof and without imposing undue torsional resistance to such turning. However, space limitations frequently limit the axial length of the seal, but with the present arrangement which involves concentric inner and outer cylindrical portions, the seal has an effective length which is twice its axial length. Moreover, this construction also makes possible the locating of the inner and outer flanges in the same radial plane so that the inner and outer races of the supporting bearing may be employed directly to clamp these flanges to the shaft and to the housing, respectively.

Inasmuch as the pressure within the housing 10 may be in the neighborhood of several hundred pounds per square inch, if the unsupported portions of the seal were not rigid in a direction resisting distortion by the pressure, the seal would be collapsed against the shaft and forced up against and possibly even into the ball bearing. This not only would damage the seal, but also would result in larger frictional resistance to turning. In order to give the seal the necessary rigidity to resist such distortion, certain metallic elements are embedded in the flexible material when the seal is molded. Embedded in the inner cylindrical portion 32 is a plurality of circular elements which are substantially rigid in radial direction. As shown more particularly in Fig. 2, these elements are dished or V-shaped in cross-section and spaced sufficiently close together so that the inner and outer peripheral edges of each element overlaps in axial direction the apex of the adjacent element. Thus, if one element is attempted to be displaced radially with respect to adjacent elements, it results in compression of the flexible material between the elements, rather than merely placing such material in shear. A plurality of similar, but of course larger circular elements 44 are embedded in the outer cylindrical portion 34 of the seal. Due to the fact that the circular elements 42 and 44 are substantially rigid in a radial direction and due to the fact that they are so close together that one cannot be displaced radially with respect to adjacent elements, they serve to support the cylindrical portions 32 and 34 against expansion or collapse due to the fluid pressure imposed thereon.

In order to support the annular portion 36 of the seal against displacement, as a result of the pressure, an annular element 46 is provided. This element includes a flat part 48 which is embedded in the annular portion 36 and dished or V-shaped inner and outer parts 50 and 52 which are embedded in the inner and outer cylindrical portions 32 and 34, respectively. The V-shaped parts 50 and 52 are located close enough to the adjacent circular elements 42 and 44 so that the apexes of the latter overlap the peripheral portions of the former.

At the opposite end, the seal is provided with annular elements 54 and 56, both of which are substantially rigid in radial direction. The element 54 has a flat portion 58 which is embedded in the inwardly extending flange 40 and an outer dished or V-shaped part 60 which is embedded in the inner cylindrical portion 32. The element 56 has a flat part 62 which is embedded in the outwardly extending flange 38 and an inner dished or V-shaped part 64 which is embedded in the outer cylindrical portion 34. The apexes of the parts 60 and 64 overlap the edge portions of the adjacent circular elements 42 and 44, respectively.

Consequently, the seal 30 is reinforced by the elements 42, 44, 46, 54 and 56 so as to be substantially rigid with respect to fluid pressure tending to expand, collapse or otherwise deform the seal. On the other hand, the seal is flexible with respect to torsional force applied thereto, inasmuch as each of the reinforcing elements may rotate slightly with respect to the adjacent element by virtue of the flexibility of the material therebetween, which material is placed in shear by such rotation. Due to the fact that the total rotation between the shaft and the housing need only be a few degrees, the relative rotation between any two adjacent reinforcing elements is very small, and hence the shearing force is also small. Therefore, the seal offers but a minimum resistance to turning, while being capable of withstanding substantial fluid pressure.

While I have shown and described one more or less specific embodiment of my invention, it is to be understood that this has been done for the purpose of illustration only, and the scope of my invention is not to be limited thereto, but is to be determined from the apended claims.

What is claimed:

1. In a seal between an element and a shaft having limited rotational movement with respect thereto, a flexible member having two circular concentric portions radially spaced from each other and joined at one end by an annular radial portion, the other end of one of said portions being secured to the shaft and the other end of the other portion being secured to the element, whereby said flexible member is subjected to torsion, and a plurality of axially spaced circular elements substantially rigid in radial direction carried by each of said circular portions.

2. In a seal between an element and a shaft having limited rotational movement with respect thereto, a flexible member of molded material having two circular concentric portions radially spaced from each other and joined at one end by an annular radial portion, the other end of one of said portions being secured to the shaft and the other end of the other portion being secured to the element, whereby said flexible member is subjected to torsion, and a plurality of axially spaced circular elements substantially rigid in radial direction embedded in said circular portions.

3. In a shaft seal, a flexible member having two substantially cylindrical concentric portions joined at one end by an annular radial portion, circular elements substantially rigid in radial direction carried by said cylindrical portions, and an annular element substantially rigid in radial direction carried by said radial portion.

4. In a shaft seal, a flexible member of molded material having two substantially cylindrical concentric portions joined at one end by an annular radial portion, circular elements substantially rigid in radial direction embedded in said cylindrical portions, and an annular element substantially rigid in radial direction embedded in said radial portion.

5. In a shaft seal, a flexible member of molded material having two substantially cylindrical concentric portions joined at one end by an annular radial portion, circular elements substantially rigid in radial direction embedded in said cylindrical portions, and an annular element substantially rigid in radial direction having its inner and outer portions embedded in the respective cylindrical portions of said member and its intermediate portion embedded in said radial portion.

6. In a shaft seal, a flexible member of molded material having two substantially cylindrical concentric portions joined at one end by an annular radial portion, the opposite end of the inner of said cylindrical portions having an inwardly extending flange and the opposite end of the outer of said cylindrical portions having an outwardly extending flange, circular elements substantially rigid in radial direction embedded in said cylindrical portions, and an annular element substantially rigid in radial direction embedded in each of said flanges.

7. In a shaft seal, a flexible member of molded material having two substantially cylindrical concentric portions joined at one end by an annular radial portion, the opposite end of the inner of said cylindrical portions having an inwardly extending flange and the opposite end of the outer of said cylindrical portions having an outwardly extending flange, circular elements substantially rigid in radial direction embedded in said cylindrical portions, and an annular element substantially rigid in radial direction embedded in said annular portion and in each of said flanges.

8. In a shaft seal, a flexible member of molded material having two substantially cylindrical concentric portions joined at one end by an annular radial portion, and circular elements substantially rigid in radial direction and V-shaped in cross-section embedded in said cylindrical portions, the inner and outer peripheral edges of said elements overlapping in axial direction the apex of the adjacent element.

9. In a shaft seal, a flexible member of molded material having two substantially cylindrical concentric portions joined at one end by an annular radial portion, circular elements substantially rigid in radial direction and dished in cross-section embedded in said cylindrical portions, and an annular element substantially rigid in radial direction having a flat part embedded in said annular portion and dished inner and outer parts embedded in the respective cylindrical portions.

10. In a shaft seal, a flexible member of molded material having two substantially cylindrical concentric portions joined at one end by an annular radial portion, circular elements substantially rigid in radial direction and V-shaped in cross-section embedded in said cylindrical portions, and an annular element substantially rigid in radial direction and having a flat part embedded in said annular portion and V-shaped inner and outer parts embedded in the respective cylindrical portions, the inner and outer peripheral edges of said V-shaped elements and the V-shaped parts of said annular element overlapping in axial direction the apex of the adjacent element.

11. In a shaft seal, a flexible member of molded material having two substantially cylindrical portions joined at one end by an annular radial portion, the opposite end of the inner of said cylindrical portions having an inwardly extending flange and the opposite end of the outer of said cylindrical portions having an outwardly extending flange, circular elements rigid in radial direction and dished in cross-section embedded in said cylindrical portions, an annular element substantially rigid in radial direction having a flat part embedded in said inwardly extending flange and a dished outer part embedded in the inner cylindrical portion, and an annular element substantially rigid in radial direction having a flat part embedded in said outwardly extending flange and a dished inner part embedded in the outer cylindrical portion.

12. In a shaft seal, a flexible member of molded material having two substantially cylindrical portions joined at one end by an annular radial portion, the opposite end of the inner of said cylindrical portions having an inwardly extending flange and the opposite end of the outer of said cylindrical portions having an outwardly extending flange, circular elements rigid in radial direction and V-shaped in cross-section embedded in said cylindrical portions, an annular element substantially rigid in radial direction having a flat part embedded in said inwardly extending flange and a V-shaped outer part embedded in the inner cylindrical portion, and an annular element substantially rigid in radial direction having a flat part embedded in said outwardly extending flange and a V-shaped inner part embedded in the outer cylindrical portion, the inner and outer peripheral edges of the V-shaped elements and of the V-shaped parts of said annular elements being in overlapping relation axially with respect to the apex of the adjacent element.

13. In a shaft seal, a flexible member of molded material having two substantially cylindrical portions joined at one end by an annular radial portion, the opposite end of the inner of said cylindrical portions having an inwardly extending flange and the opposite end of the outer of said cylindrical portions having an outwardly extending flange, circular elements rigid in radial direction and dished in cross-section embedded in said cylindrical portions, an annular element substantially rigid in radial direction having a flat part embedded in said inwardly extending flange and a dished outer part embedded in the inner cylindrical portion, an annular element substantially rigid in radial direction having a flat portion embedded in said outwardly extending flange and a dished inner part embedded in the outer cylindrical portion, and an annular element substantially rigid in radial direction having a flat part embedded in said annular portion and dished inner and outer parts embedded in the respective cylindrical portions.

14. In a shaft seal, a flexible member of molded material having two substantially cylindrical portions, joined at one end by an annular radial portion, the opposite end of the inner of said cylindrical portions having an inwardly extending flange and the opposite end of the outer of said cylindrical portions having an outwardly extending flange, circular elements rigid in radial direction and V-shaped in cross-section embedded in said cylindrical portions, an annular element substantially rigid in radial direction having a flat part embedded in said inwardly extending flange and a V-shaped outer part embedded in the inner cylindrical portion, an annular element substantially rigid in radial direction having a flat part embedded in said outwardly extending flange and a V-shaped inner part embedded in the outer cylindrical portion, and an annular element substantially rigid in radial direction and having a flat part embedded in said annular portion and V-shaped inner and outer parts embedded in the respective cylindrical portions, the inner and outer peripheral edges of the V-shaped elements and of the V-shaped parts of said annular elements being in overlapping relation axially with respect to the apex of the adjacent element.

15. In a device of the class described, a housing having an opening therein, means providing an annular surface on said casing extending around said opening, a shaft extending through said opening, a collar on said shaft, an anti-friction bearing for supporting said shaft in said opening and including an inner race on said shaft and an outer race in said opening, a fluid-tight flexible seal between said shaft and said housing including a pair of concentric cylindrical portions joined together at one end by an annular radial portion, the opposite end of the inner cylindrical portion having an inwardly extending flange clamped between said inner race and said collar and the opposite end of the outer cylindrical portion having an outwardly extending flange clamped between said outer race and said annular surface, and circular elements substantially rigid in radial direction carried by said cylindrical portions.

KNUTE ARNOLD HOLST.

REFERENCES CITED

The following references are of record in the file of this patent:

UNITED STATES PATENTS

| Number | Name | Date |
|---|---|---|
| 184,461 | Cooper | Nov. 21, 1876 |
| 1,686,339 | Murray | Oct. 2, 1928 |
| 2,212,607 | Langdon | Aug. 27, 1940 |
| 2,324,173 | Porter | July 13, 1943 |
| 2,385,420 | Meyer | Sept. 25, 1945 |

FOREIGN PATENTS

| Number | Country | Date |
|---|---|---|
| 455,615 | Great Britain | 1936 |